US009731418B2

(12) United States Patent
Neff et al.

(10) Patent No.: US 9,731,418 B2
(45) Date of Patent: Aug. 15, 2017

(54) METHODS AND APPARATUS FOR CLOSED LOOP FORCE CONTROL IN A LINEAR ACTUATOR

(71) Applicant: Systems, Machines, Automation Components Corporation, Carlsbad, CA (US)

(72) Inventors: Edward A. Neff, Cardiff-by-the-Sea, CA (US); Toan M. Vu, San Diego, CA (US)

(73) Assignee: Systems Machine Automation Components Corporation

( * ) Notice: Subject to any disclaimer, the term of this patent is extended or adjusted under 35 U.S.C. 154(b) by 127 days.

(21) Appl. No.: 14/876,716

(22) Filed: Oct. 6, 2015

(65) Prior Publication Data
US 2016/0184989 A1  Jun. 30, 2016

Related U.S. Application Data (60) Provisional application No. 62/060,509, filed on Oct. 6, 2014.

(51) Int. Cl.
*B25J 9/16* (2006.01)
*G05B 19/401* (2006.01)

(52) U.S. Cl.
CPC .......... *B25J 9/1633* (2013.01); *G05B 19/401* (2013.01); *G05B 2219/37021* (2013.01);
(Continued)

(58) Field of Classification Search
CPC ........ G05B 19/401; G05B 2219/37207; G05B 2219/37411; G05B 2219/37622;
(Continued)

(56) References Cited

U.S. PATENT DOCUMENTS

| 4,488,242 A | 12/1984 | Tabata et al. |
| 4,576,421 A | 3/1986 | Teramachi |

(Continued)

FOREIGN PATENT DOCUMENTS

| DE | 2217958 A1 | 10/1973 |
| EP | 0556469 A1 | 8/1993 |

(Continued)

OTHER PUBLICATIONS

International Search Report and Written Opinion for International Application No. PCT/US2016/014602, mailed May 12, 2016, 9 pages.

(Continued)

*Primary Examiner* — Jason Holloway
(74) *Attorney, Agent, or Firm* — Cooley LLP (57) ABSTRACT

A system and method for using a probe assembly to apply a desired force to a target surface. The method includes moving the probe assembly into an approach position, the approach position being a predetermined distance from the target surface. The probe assembly is then moved from the approach position to the target surface pursuant to a soft landing procedure. The soft landing procedure includes determining that the probe assembly has moved into soft contact with the target surface. The method further includes applying, subsequent to establishment of the soft contact between the probe assembly and the target surface, force to the probe assembly until an applied force on the target surface reaches the desired force. The applied force may then be monitored based upon an output of a load cell responsive to a force exerted by the probe assembly.

11 Claims, 4 Drawing Sheets

(52) U.S. Cl.
CPC ........... *G05B 2219/37207* (2013.01); *G05B 2219/37411* (2013.01); *G05B 2219/40599* (2013.01); *G05B 2219/45061* (2013.01); *G05B 2219/50109* (2013.01); *Y10S 901/09* (2013.01)

(58) Field of Classification Search
CPC .......... G05B 2219/37624; G05B 2219/50109; G05B 2219/45061; G05B 2219/40599; G05B 2219/37021; B25J 9/1633; Y10S 901/09
See application file for complete search history.

(56) References Cited

U.S. PATENT DOCUMENTS

| | | | |
|---|---|---|---|
| 4,616,886 | A | 10/1986 | Teramachi |
| 4,693,676 | A | 9/1987 | Inaba |
| 4,745,589 | A | 5/1988 | Nomura |
| 4,799,803 | A | 1/1989 | Tanaka |
| 4,804,913 | A | 2/1989 | Shimizu et al. |
| 4,808,955 | A | 2/1989 | Godkin et al. |
| 4,857,786 | A | 8/1989 | Nihei et al. |
| 4,858,452 | A | 8/1989 | Ibrahim |
| 5,051,635 | A | 9/1991 | Kasahara |
| 5,053,670 | A | 10/1991 | Kosugi |
| 5,111,088 | A | 5/1992 | Fujino |
| 5,160,865 | A | 11/1992 | Gururangan |
| 5,175,456 | A | 12/1992 | Neff et al. |
| 5,225,725 | A | 7/1993 | Shiraki et al. |
| 5,270,625 | A | 12/1993 | Neff |
| 5,317,222 | A | 5/1994 | Neff et al. |
| 5,376,862 | A | 12/1994 | Stevens |
| 5,446,323 | A | 8/1995 | Neff et al. |
| 5,450,050 | A | 9/1995 | Ban et al. |
| 5,476,324 | A | 12/1995 | Takei |
| 5,501,498 | A | 3/1996 | Ulrich |
| 5,594,309 | A | 1/1997 | McConnell et al. |
| 5,685,214 | A | 11/1997 | Neff et al. |
| 5,722,300 | A | 3/1998 | Burkhard et al. |
| 5,751,075 | A | 5/1998 | Kwon et al. |
| 5,834,872 | A | 11/1998 | Lamb |
| 5,859,482 | A | 1/1999 | Crowell et al. |
| 5,893,646 | A | 4/1999 | Mizutani et al. |
| 5,952,589 | A * | 9/1999 | Leung .................. G01B 7/002 33/558 |
| 6,043,573 | A * | 3/2000 | Neff .................... H02K 41/035 310/13 |
| 6,091,167 | A | 7/2000 | Neff et al. |
| 6,118,360 | A | 9/2000 | Neff |
| 6,223,971 | B1 | 5/2001 | Sato |
| 6,290,308 | B1 | 9/2001 | Zitzelsberger |
| 6,439,103 | B1 | 8/2002 | Miller |
| 6,741,151 | B1 | 5/2004 | Livshitz et al. |
| 6,848,164 | B2 | 2/2005 | Jung |
| 6,907,651 | B1 | 6/2005 | Fisher et al. |
| 6,997,077 | B2 | 2/2006 | Kollmann et al. |
| 7,053,583 | B1 | 5/2006 | Hazelton |
| 7,168,748 | B2 | 1/2007 | Townsend et al. |
| 7,482,717 | B2 | 1/2009 | Hochhalter et al. |
| 8,083,278 | B2 | 12/2011 | Yuan |
| 8,498,741 | B2 | 7/2013 | Ihrke et al. |
| 9,375,848 | B2 | 6/2016 | Neff et al. |
| 9,381,649 | B2 | 7/2016 | Neff et al. |
| 2003/0009241 | A1 | 1/2003 | Kruger et al. |
| 2004/0076348 | A1 | 4/2004 | Dalessandro et al. |
| 2005/0211512 | A1 | 9/2005 | Fenwick |
| 2005/0234565 | A1* | 10/2005 | Marks .................. G05B 19/409 700/61 |
| 2005/0253469 | A1 | 11/2005 | Hochhalter et al. |
| 2006/0023980 | A1 | 2/2006 | Kato et al. |
| 2006/0113847 | A1 | 6/2006 | Randall et al. |
| 2008/0048505 | A1 | 2/2008 | Moriyama et al. |
| 2008/0157607 | A1 | 7/2008 | Scheich et al. |
| 2008/0258654 | A1* | 10/2008 | Neff ..................... F15B 15/088 318/1 |
| 2009/0040247 | A1 | 2/2009 | Cato et al. |
| 2009/0058198 | A1 | 3/2009 | Finkbeiner et al. |
| 2009/0058581 | A1 | 3/2009 | Neff et al. |
| 2009/0114052 | A1 | 5/2009 | Haniya et al. |
| 2009/0152960 | A1 | 6/2009 | Kimura et al. |
| 2009/0261663 | A1 | 10/2009 | Aso et al. |
| 2009/0278412 | A1 | 11/2009 | Kimura et al. |
| 2010/0005918 | A1 | 1/2010 | Mizuno et al. |
| 2010/0133924 | A1 | 6/2010 | Neff et al. |
| 2010/0203249 | A1 | 8/2010 | Elgimiabi |
| 2010/0274365 | A1 | 10/2010 | Evans et al. |
| 2011/0068595 | A1 | 3/2011 | Ihrke et al. |
| 2012/0043832 | A1 | 2/2012 | Neff et al. |
| 2012/0080960 | A1 | 4/2012 | Neff et al. |
| 2012/0305092 | A1* | 12/2012 | Corso ............... B01L 3/502715 137/15.01 |
| 2014/0159407 | A1 | 6/2014 | Neff et al. |
| 2014/0159408 | A1 | 6/2014 | Neff et al. |
| 2014/0159513 | A1 | 6/2014 | Neff et al. |
| 2014/0159514 | A1* | 6/2014 | Neff ..................... H02K 41/02 310/12.33 |
| 2014/0210396 | A1 | 7/2014 | Yamanaka et al. |
| 2015/0171723 | A1 | 6/2015 | Neff et al. |
| 2015/0303785 | A1 | 10/2015 | Neff et al. |
| 2016/0013712 | A1 | 1/2016 | Neff et al. |

FOREIGN PATENT DOCUMENTS

| | | |
|---|---|---|
| EP | 1278109 | 1/2003 |
| EP | 1827073 | 8/2007 |
| GB | 645281 A | 10/1950 |
| JP | 61-116964 A2 | 6/1986 |
| JP | 04-181562 | 6/1992 |
| JP | 03285554 A | 12/1992 |
| JP | 06-260332 | 9/1994 |
| JP | 07-015942 | 1/1995 |
| JP | 07-131967 A | 5/1995 |
| JP | H09-214187 | 8/1997 |
| JP | 2000-152592 A | 5/2000 |
| JP | 2001-238427 A | 8/2001 |
| JP | 2001-286121 A2 | 10/2001 |
| JP | 2002-176292 | 6/2002 |
| JP | 2004-332935 | 11/2004 |
| JP | 2005-020901 A | 1/2005 |
| JP | 2005-080415 | 3/2005 |
| JP | 2008-048556 A | 2/2008 |
| JP | 2008-155302 A2 | 7/2008 |
| JP | 2008-193845 A2 | 8/2008 |
| JP | 2010-178614 A | 8/2010 |
| KR | 10-2008-0090040 | 10/2008 |
| KR | 20-2011-0003488 | 4/2011 |
| KR | 10-2011-0139434 | 12/2011 |
| WO | WO 2007/026566 A1 | 3/2007 |
| WO | WO 2007/063729 A1 | 6/2007 |
| WO | WO 2009/116343 A1 | 9/2009 |
| WO | WO 2009/117827 | 10/2009 |
| WO | WO 2011/088964 A1 | 7/2011 |
| WO | WO 2014/076809 | 5/2014 |
| WO | WO 2015/117095 | 8/2015 |
| WO | WO 2015/154026 | 10/2015 |

OTHER PUBLICATIONS

PCT/US2013/047727, International Search Report mailed Oct. 16, 2013, 3 pages.
PCT/US2013/047727, Written Opinion mailed Oct. 16, 2013, 4 pages.
PCT/US2013/047727, International Preliminary Report on Patentability mailed Dec. 31, 2014, 5 pages.
PCT/US2013/047728, International Search Report mailed Oct. 16, 2013, 3 pages.
PCT/US2013/047728, Written Opinion mailed Oct. 16, 2013, 6 pages.
PCT/US2013/047728, International Preliminary Report on Patentability mailed Dec. 31, 2014, 7 pages.
PCT/US2008/071988, International Search Report and Written Opinion mailed Nov. 3, 2008, 5 pages.

(56) References Cited

OTHER PUBLICATIONS

PCT/US2008/071988, International Preliminary Report on Patentability mailed Feb. 2, 2010, 5 pages.
PCT/US2008/052121, International Search Report and Written Opinion mailed Aug. 6, 2008, 5 pages.
PCT/US2008/052121, International Preliminary Report on Patentability mailed Jul. 28, 2009, 5 pages.
International Search Report and Written Opinion for International Application No. PCT/US2011/053070, mailed Feb. 16, 2012, 6 pages.
International Preliminary Report on Patentability International Application No. PCT/US2011/053070, mailed Mar. 26, 2013, 5 pages.
Supplementary European Search Report for European Application No. 14191347.5, dated May 4, 2015, 7 pages.
International Search Report and Written Opinion for International Application No. PCT/US2015/014133, mailed Apr. 29, 2015, 8 pages.
International Search Report and Written Opinion for International Application No. PCT/US2015/024341, mailed Jul. 15, 2015, 10 pages.
International Search Report and Written Opinion for International Application No. PCT/US2015/054314, mailed Jan. 22, 2016, 10 pages.
Semiconductor Components Industries, LLC, "DC Motor Driver Fundamentals," Publication Order No. TND6041/D, ON Semiconductor [online], Mar. 2014—Rev. 1, pp. 1-9, www.onsemi.com.
Machine Design, Design FAQs, Variable Wattage Control Systems for Electric Heaters, "Moving coil motor technology," [online], Feb. 26, 2009, [Retrieved from the Internet: Jul. 31, 2015], <URL: http://machinedesign.com/motion-control/moving-coil-motor-technology>, 1 page.
Thomas Publishing Company, Product News: Mechanical Power Transmission, "Actuator and Ball Spline come in mini and micro sizes," [online], Sep. 3, 2004, [Retrieved from the Internet: Aug. 7, 2015], <URL: http://news.thomasnet.com/fullstory/455177>, 5 pages.
Luna Bearings, Automation & Power Transmission, WON Linear Motion System, "Compact Ball Spline," [online], 2009, [Retrieved from the Internet: Aug. 7, 2015], <URL: http://www.lunabearings.com/won.htm>, 6 pages.

\* cited by examiner

METHODS AND APPARATUS FOR CLOSED LOOP FORCE CONTROL IN A LINEAR ACTUATOR

CROSS-REFERENCE TO RELATED APPLICATIONS

This application claims priority under 35 U.S.C. §119(e) to U.S. Provisional Patent Application Ser. No. 62/060,509, filed on Oct. 6, 2014 and entitled METHODS AND APPARATUS FOR CLOSED LOOP FORCE CONTROL IN A LINEAR ACTUATOR, the content of which is hereby incorporated by reference herein in its entirety for all purposes.

The following U.S. patent applications are hereby incorporated herein by reference for all purposes:

Application Ser. No. 13/927,075, filed Jun. 25, 2013 and entitled ROBOTIC FINGER;

Application Ser. No. 13/927,076, filed Jun. 25, 2013 and entitled ROBOTIC FINGER;

Application Ser. No. PCT/US2013/047727, filed Jun. 25, 2013 and entitled ROBOTIC FINGER;

Application Ser. No. 13/927,079, filed Jun. 25, 2013 and entitled LOW-COST, REDUCED DIAMETER LINEAR ACTUATOR;

Application Ser. No. 13/927,078, filed Jun. 25, 2013 and entitled LOW-COST, REDUCED DIAMETER LINEAR ACTUATOR;

Application Ser. No. PCT/US2013/047728, filed Jun. 25, 2013 and entitled LOW-COST, REDUCED DIAMETER LINEAR ACTUATOR;

Application Ser. No. 12/184,918, filed Aug. 1, 2008 and entitled COMPACT LINEAR ACTUATOR AND METHOD OF MAKING SAME;

Application Ser. No. PCT/US2008/071988, filed Aug. 1, 2008 and entitled COMPACT LINEAR ACTUATOR AND METHOD OF MAKING SAME;

Application Ser. No. 12/020,466, filed Aug. 1, 2008 and entitled COMBINATION PNEUMATIC AND ELECTRIC LINEAR ACTUATOR;

Application No. PCT/US2008/052121, filed Jan. 25, 2008 and entitled COMBINATION PNEUMATIC AND ELECTRIC LINEAR ACTUATOR;

Application Ser. No. 12/188,111, filed Aug. 7, 2008, and entitled MICRO SHIM FOR MOVING COIL ACTUATOR;

Application Ser. No. 12/622,372, filed Nov. 19, 2009 and entitled COMPACT LINEAR ACTUATOR AND METHOD OF MAKING SAME;

Application Ser. No. 12/860,809, filed Aug. 20, 2010 and entitled COMPACT LINEAR ACTUATOR WITH ROTARY MECHANISM;

Application Ser. No. 13/244,156, filed Sep. 23, 2012 and entitled LOW COST MULTI-COIL LINEAR ACTUATOR;

Application Ser. No. PCT/US2011/053070, filed Sep. 23, 2011 and entitled LOW COST MULTI-COIL LINEAR ACTUATOR;

Application Ser. No. PCT/US2015/014133, filed Feb. 2, 2015 and entitled DIRECT DRIVE MOTOR FOR ROBOTIC FINGER.

FIELD

The present disclosure pertains generally to machines which are useful for assembling or manufacturing an end product. More particularly, the present disclosure pertains to methods for controlling the forces that move assembly machine parts during assembly or manufacture of the end product. The present disclosure is particularly, but not exclusively, useful for the manufacture of end products that incorporate delicate or fragile components that require soft contact forces during assembly of the end product.

BACKGROUND

Quality control is important in the manufacture of components in an assembly process. Often, components are manufactured with precise dimensions and have tight critical tolerance requirements. Machines such as actuators can be used to inspect, measure and determine if one or more critical dimensions of the component are within tolerance. For example, the probe assembly of a moving coil actuator may be used to precisely measure a dimension of interest. The measurement is then used to determine if the dimension is within a tolerance window.

Linear actuators are mechanical devices which are used to perform repetitive actions requiring linear motion. For example, linear actuators can be used in an assembly plant for placing caps on bottles, for automatically stamping or labeling mail, for glass cutting, for placing chips on circuits, for testing various buttons or touch areas on electronic devices, for automation, and for a wide variety of other purposes as well.

When considering the operation of a machine that is to be used for the purpose of either assembling separate individual component parts into an end product, or moving a tool into contact with a work surface of the end product, the consequences of the manufacturing process on the end product needs to be addressed. For example, in some instances, a machine can be used for the manufacture of an end product that incorporates a probe assembly that is to be moved, for example, into contact with a work surface (or a target surface) on the end product. Because the machine operates to move a first body (the probe assembly) into contact with a second body (the target surface of the end product), forces are generated against both bodies by this action. It happens, however, that many end products incorporate very delicate and fragile components that can be easily damaged if the contact forces that are generated during assembly of the end product become too large. Consequently, in order to avoid damage to the end product, it is often desirable that precise pre-determined forces be generated against specified component parts of the end product during its assembly or manufacture.

Accordingly, a need exists for methods and apparatus for moving a probe assembly into soft contact with a work surface that selectively monitors specified movement parameters of the probe assembly to control the contact forces between the probe assembly and the target surface.

SUMMARY

Methods and apparatus are described herein that can implement a dual open loop and closed loop procedure to apply a desired force to a target surface. Such methods may involve rapidly moving the probe assembly an approach position located a safe distance from the target surface. The approach position will typically be selected to be as close as possible to the target surface without risking abrupt or forceful contact with the surface. Once the probe assembly has been positioned close to, but safely above, the target surface, a soft landing procedure may be employed to bring the probe assembly in soft contact with the target surface.

Once soft contact with target surface has been established, a desired force may be applied to the surface by the probe assembly in accordance with one of at least two different procedures. In a first of these procedures open loop force control is employed such that a relatively high percentage of the desired force is initially applied to the target surface. A closed loop force control mode of operation may then be employed to increase the applied force to the desired level. During the closed loop force control mode of operation various linear and/or non-linear least squares regression analysis based techniques can be implemented to control the force applied to the probe assembly in fixed steps to very precisely achieve the desired force between the probe assembly and the target surface.

In a second, alternate procedure employed after the establishment of soft contact, open loop force control is utilized to apply the desired force to the target surface. The applied force may then be monitored by, for example, using a load cell or the like and adjusted to the extent necessary to maintain the applied force at the desired level.

In a particular aspect the disclosure relates to a method for using a probe assembly to apply a desired force to a target surface. The method includes moving the probe assembly into an approach position, the approach position being a predetermined distance from the target surface. The probe assembly is then moved from the approach position to the target surface pursuant to a soft landing procedure. The soft landing procedure includes determining that the probe assembly has moved into soft contact with the target surface. The method further includes applying, subsequent to establishment of the soft contact between the probe assembly and the target surface, force to the probe assembly until an applied force on the target surface reaches the desired force. The applied force may then be monitored based upon an output of a load cell responsive to a force exerted by the probe assembly.

In a particular implementation the additional force may applied subsequent to the establishment of soft contact by applying an initial portion of the desired force to the target surface by operating the probe assembly in an open loop force control mode. A remaining portion of the desired force may then be applied to the target surface by operating the probe assembly in a closed loop force mode of operation which utilizes the output of the load cell.

The disclosure also pertains to an apparatus including an actuator having a probe moveable in at least one dimension. A load cell is operative to measure a force exerted by the probe on a contact surface and to provide an output signal based upon the force. A controller is configured to provide control signals to the actuator based upon a set of input parameters and the output signal.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Figure 1:
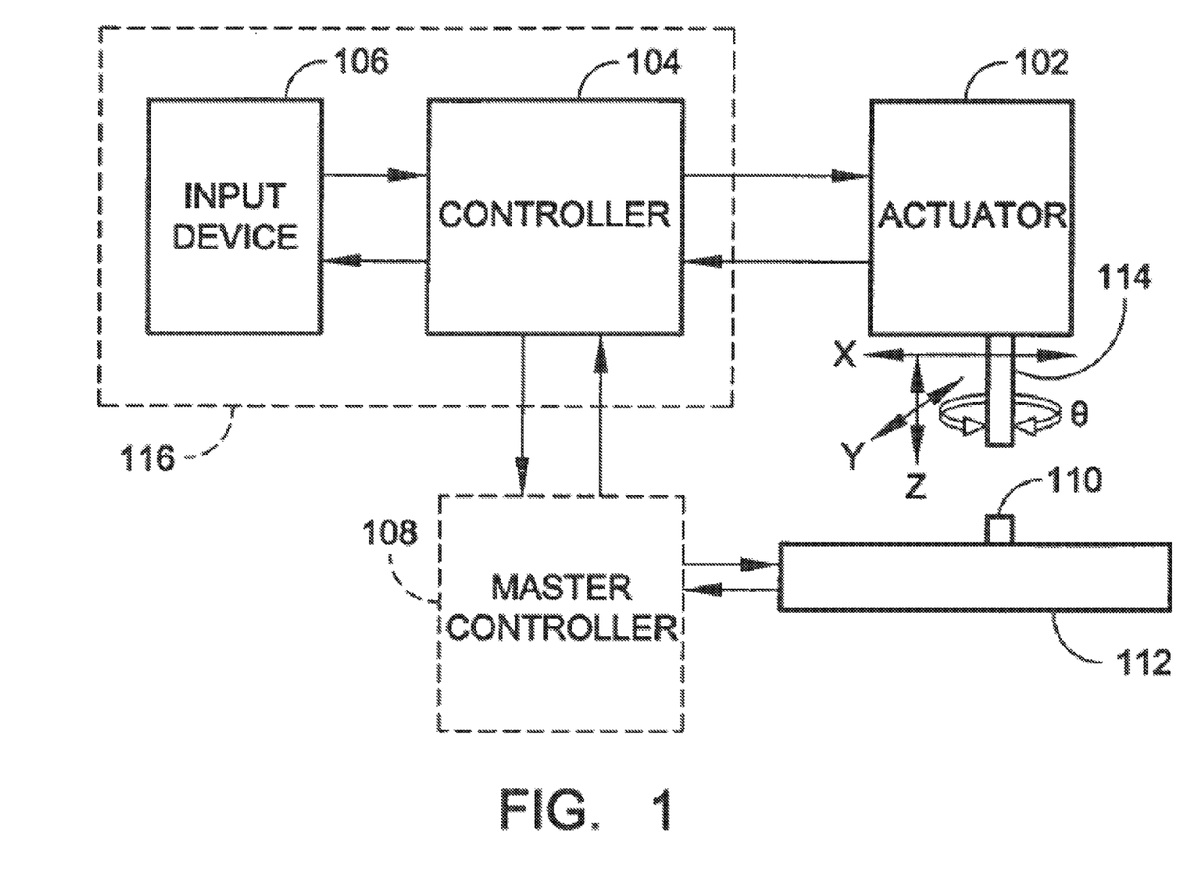
FIG. 1 is a system block diagram of a programmable and automated, actuator-based component inspection system, according to an embodiment.

FIG. 1 is a system block diagram of a programmable and automated, actuator-based component inspection system, according to an embodiment. Referring FIG. 1, the system 100 includes an actuator 102, a controller 104, an input device 106 and a master controller 108. Also shown is a component 110 to be inspected, where the component is positioned by a handler 112. The actuator 102 can be any actuator based device, such as a pneumatic, hydraulic or electrical actuator. In preferred embodiments, the actuator 102 is an electrical actuator, such as a moving coil actuator (also known as a voice coil actuator) or a moving magnet actuator. It is understood that although one actuator 102 is illustrated, the system 100 can be configured to include more than one actuator. In the illustrated embodiment, the actuator 102 includes a probe assembly 114 that is moveable in at least one axis. For example, depending on the specific actuator used, the probe assembly 114 may be moved in an x, y and/or z axis relative to the body of the actuator 102. Furthermore, the probe assembly 114 may be rotational (θ) about one or more of the x, y and/or z axes. It is also noted that although the actuator 102 illustrated shows potentially four axes of actuation, an actuator may be provided that has only one axis of actuation.

The probe assembly 114 can be moved to contact different portions of a component 110. Typically, the component 110 is moved into or held in an inspection orientation by the handler 112. For example, the handler 112 may be a robotic conveyor or gripper system controlled by the master controller 108 that locates the component 110 at a known reference location relative to the probe assembly 114.

The actuator 102 can include one or more encoders (not shown) that are capable of taking positional measurements about one or more axes. That is, in response to control signals from the controller 104, the actuator 102 sends measurements from its encoders to the controller 104 to indicate the precise positional location of the probe assembly about the relevant axes. In this way the probe assembly may be moved to an approach position relatively close to, but safely away from, a target surface of interest. The probe assembly 114 is able to perform a "soft-land" operation where the probe assembly 114 is brought into contact with a surface of the component 110 so as not to damage the surface of the component 110 and also to establish an accurate contact location. Additional information about the soft-land operation is set forth in U.S. Pat. No. 5,952,589 entitled "Soft Landing Method for Probe Assembly" (the "'589 patent") and U.S. Publication No. 2005/0234565 entitled "Programmable Control System for Automated Actuator Operation", respectively, both of which are hereby incorporated by reference in their entireties for all purposes. As is described below, once the probe assembly has established soft contact with the target surface, the controller 104 may implement various open loop and/or closed loop modes of force control to cause the probe assembly to apply a desired force to the target surface.

As is discussed in the '589 patent, the soft-land procedure typically involves placing the probe assembly at an approach position. This approach position can be arbitrarily established in accordance with the desires of the operator, but preferably, the approach position places the probe assembly much closer than about one millimeter away from the target surface. The approach position will generally be dependent on the characteristics of the target surface; namely, the approach position can be made to be closer to smooth target surfaces relative to rougher surfaces without substantially increasing the risk of forceful, inadvertent contact. In any event, the probe assembly is placed at the approach position for subsequent movement along a path from the approach position into soft contact with a predetermined point on the target surface.

Initially, the probe assembly is held stationary at the approach position. Then, the forces which are acting to hold the probe assembly stationary are changed in magnitude until the inherent static friction forces that have been acting on the stationary probe assembly are overcome. When the static friction forces have been overcome, the system becomes dynamic and the probe assembly advances toward the work surface under the influence of the resultant force.

As the probe assembly is advanced toward the target surface, it is monitored to determine when soft contact is made with the work surface. Specifically, several control modes of operation for determining soft contact are possible. In particular, each of these control modes depends on a measurable parameter that is characteristic of the movement of the probe assembly. These measurable parameters include i) the probe's travel position on the path toward the work surface (position control mode), ii) its velocity (velocity control mode), and iii) the acceleration/deceleration of the probe assembly (torque control mode). In an alternate embodiment, none of the above mentioned measurable parameters are monitored and, instead, the probe assembly is allowed to merely advance into soft contact with target surface under the influence of the resultant force (basic mode). The position control mode of operation, velocity control mode of operation and the torque control mode of operation are described in further detail in the '589 patent.

Additionally, the actuator 102 can include one or more load cells (i.e., force sensors) that are capable of measuring force such as, for example, the force exerted by a probe assembly 114 on a target surface about a given axis. In such implementations activation of a load cell may determine when soft contact between the probe assembly 114 and the component 110 has been established.

As is described hereinafter, once the probe assembly has established soft contact with the target surface, the controller 104 may implement various open loop and/or closed loop modes of force control to cause the probe assembly to apply a desired force to the target surface. During operation in the closed loop force mode, the controller 104 will typically be responsive to an output signal (e.g., an electrical current) generated by the load cells.

The controller 104 can control the movements of the probe assembly 114. For example, the controller 104 can be a servo controller that can operate a moving coil actuator. The master controller 108, if present, controls the larger assembly and inspection system. For example, the master controller 108 can be a part of an inline assembly system that controls the flow or positioning of the component(s) 110 to be inspected by the actuator 102. The master controller can send start/stop signals to the controller 104. In response, the controller 104 controls the inspection process of the actuator 102 and can output data, for example, in the form of measurements or pass/fail results of programmed tolerances. Accordingly, the controller 104 and/or the master controller 108 can determine if the inspected component is acceptable or should be discarded. In some configurations, the controller 104 can be, for example, a Galil DMC31012 controller with built-in amplifier and a 16 bit analog output. In another type of inspection, a switch test can be performed in which the probe assembly 114 is moved into position to depress a switch while monitoring the force required to depress the switch and/or to hold it in a depressed position. Such forces may be monitored to determine if the switch is within a specified tolerance window.

As is known, the controller 104, such as a servo controller, can generate control signals that operate the actuator 102. For example, in accordance with programmed instructions, typically in the form of software, the controller 104 can generate control signals and output such control signals to the actuator 102 to cause movement of the probe assembly 114 about one or more axes. In one embodiment the controller 104 is programmed to control the actuator 102 depending on the application, i.e., depending on the component to be inspected. For example, the controller 104 includes software that is specifically configured to cause the desired actuator movement and measurement for the specific component to be inspected. Typically, a computer (not shown) is coupled to the controller 104 to generate and transmit software (code representing a set of instructions to be executed) generated in a programming language to the controller for the specific application. Such software, once running on the controller 104, will instruct actuator 102 to cause probe assembly 14 to perform movements and measurements for that specific application or component.

Figure 3:
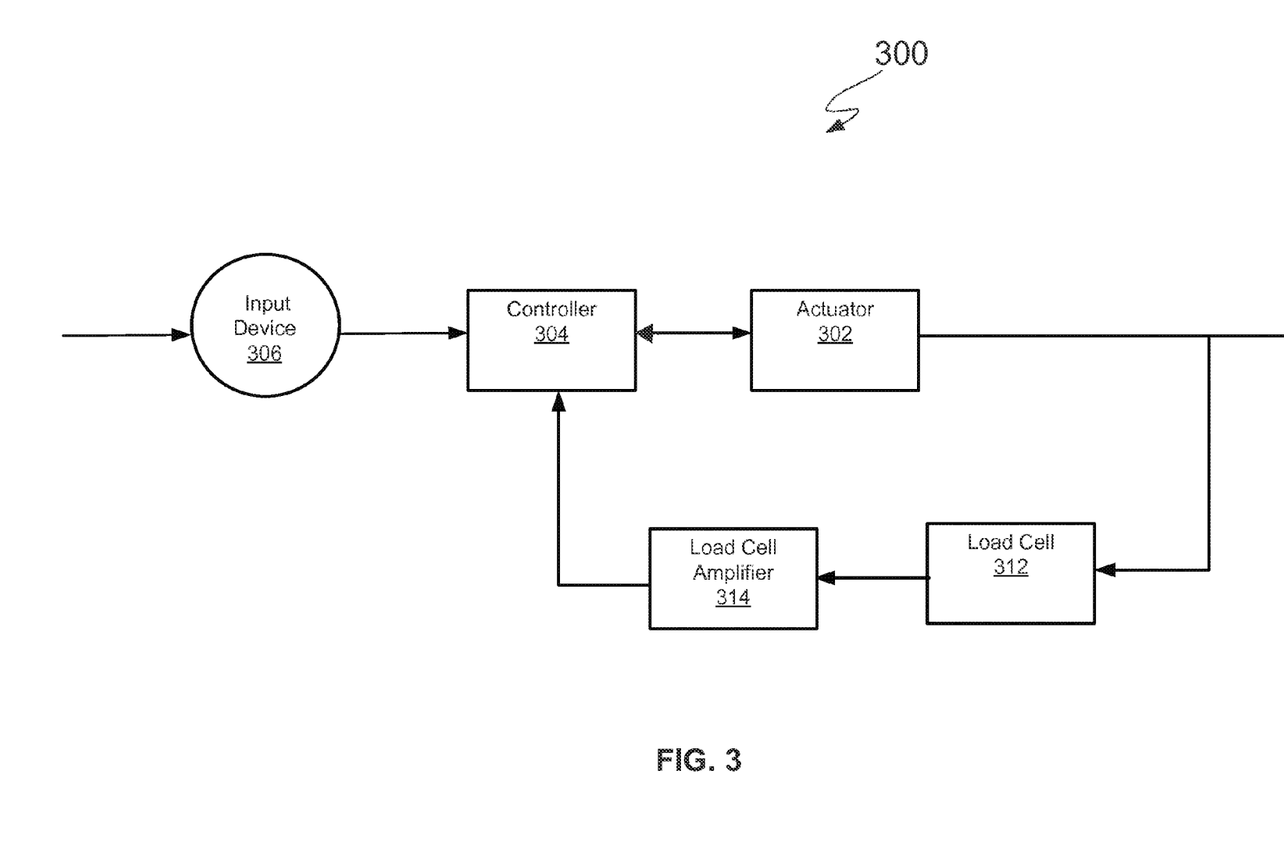
FIG. 3 is a functional block diagram of a system including a closed loop force feedback arrangement used to effect soft contact of a probe assembly to a target, according to an embodiment.

In some instances, the programmed instruction or software can include instructions for the controller 104 to implement a force mode of operation and use a closed loop force feedback mechanism to guide and determine soft contact of the probe assembly 114 to the component 110 (i.e., target surface) as described in detail in relation to FIG. 3. In such instances the actual soft contact force between the probe assembly 114 and the component 110 is monitored by a load cell that can be mounted directly onto the probe assembly 114 (or the actuator 102). Activation of the load cell may then be deemed to be determinative of when appropriate soft contact has occurred between the probe assembly 114 and the component 110.

Typically, a control system is provided to the controller 104 that includes generic programming instructions that are programmable by a user in a non-programming language to operate the actuator-based component inspection system in an automated fashion. Thus, the controller 104 is provided with programming instructions (such as software generated by a programmer) stored in memory that can allow the user to finalize the programming of inspection controls to the specifics of the given application or component to be inspected, and without necessitating that the user have any knowledge of computer code programming. It is to be noted that these programming instructions are incomplete on their own such that without a motion profile for a specific component 110, the program instructions are unable to execute an inspection routine for that component 110. Advantageously, rather than requiring a skilled software programmer to develop a software program to operate the actuator 102 for the given application (including for all probe movements, measurements and tolerance determinations), a generic instruction program is developed and provided that includes a non-programming language user interface that allows the user to input and store all relevant parameters. Such parameters may include, for example, probe movements, velocities, time delays, measurements and tolerance measurements that are specific to the application. Advantageously, the code or instructions comprising the program can be the same for different applications, where the user can input parameters defining a motion profile that is used by the programmed instructions to operate the actuator 102 in automated use. As used herein, a motion profile can be referred to as a stored sequential set of probe movements and actions (e.g., to cause position measurements) and tolerance values associated with certain measurements which collectively define the operation of the probe assembly 114 and measurements taken during an inspection routine. Additionally, in other embodiments, the program instructions can allow the user to program separate motion profiles for separate components that can be stored in the input device 106 or the controller 104. In some instances, motion profiles stored in the input device 106 can be transferred from the input device 106 to other controllers 104 operating other actuators 102.

In other configurations, the control system programming instructions are stored on and executed in part by both the input device 106 and the controller 104. The input device 106 can be any device that can allow the user to input the desired actuator parameters such as, for example, a handheld device (e.g., a handheld pendant), a personal computer, a notebook computer, and/or the like. The input device 106 can be coupled to the controller 104 via, for example, an RS-232, EIA-232, EIA-422 or EIA-485 connection. In other instances, however, the coupling of the input device 106 to the controller 104 can be done via any wired or wireless communication methods to communicate input data to the controller. The input device 106 may be a separate device as illustrated in FIG. 1 or may be physically part of the controller 104 (as indicated by dashed control block 116). For example, the controller 104 may include an integrated user key entry means attached to the controller body. It is to be noted that the programming instructions stored on and executed by the input device 106 is different than the programming instructions stored on and executed by the controller 104 and collectively facilitates the user's ability to store a variety of motion profiles.

The input device 106 can include a display unit (not shown in FIG. 1) that can be, for example, a liquid crystal display (LCD) unit or a light emitting diode (LED) alphanumeric display unit that displays a graphical user interface (GUI) generated by the control system. The GUI displayed on the display unit can allow a user to interact with the controller 104. The GUI may include a set of displays having message areas, interactive fields, pop-ups, pull-down lists, notification areas, and buttons operated by user. The GUI may include multiple levels of abstraction including groupings and boundaries. It should be noted that the term GUI may be used in the singular or in the plural to describe one or more GUI's, and each of the displays of a particular GUI may provide users of the with an efficient and user-friendly communications and control tool for the controller 104. The programming instructions or code (implemented as software and/or firmware) of the control system are configured to receive a variety of user input parameters via the input device 106 to establish and store an automated routine or motion profile for automated execution.

Figure 2:
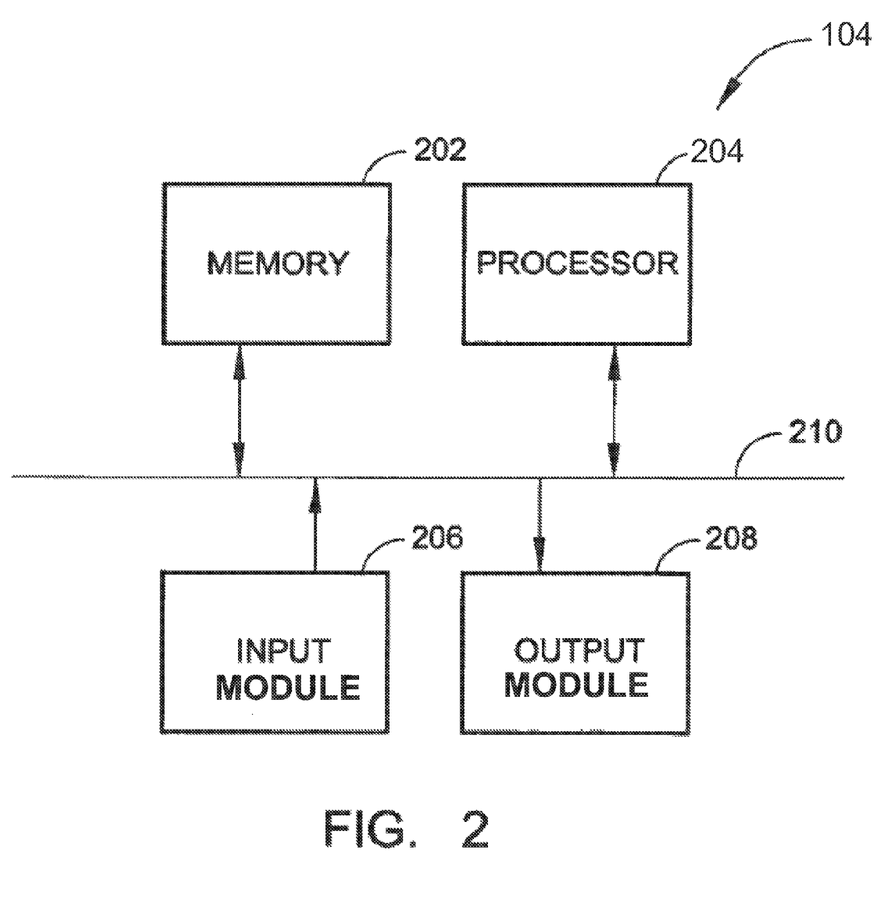
FIG. 2 is a hardware block diagram of an exemplary implementation an embodiment of a controller used in the system of FIG. 1.

FIG. 2 is a hardware block diagram of an exemplary implementation of an embodiment of the controller 104 or, alternatively, of the control block 116. As shown, the controller 104 includes a memory 202, a processor 204, an input module 206, an output module 208 and a bus 210. The memory 202 can be, for example, any type of non-volatile memory device, a random access memory (RAM), a memory buffer, a hard drive, a database, an erasable programmable read-only memory (EPROM), an electrically erasable read-only memory (EEPROM), a read-only memory (ROM) and/or so forth. The memory 202 can store instructions to cause the processor 204 to execute modules, processes and/or functions associated with the controller 104 and/or the control block 116. It is understood that although a single memory 202 is illustrated, the memory 202 may comprise one or more separate memory devices. Generically, the memory 202 may also be referred to as a computer readable medium. In a broad sense, the memory or computer readable medium refers to any type of medium that stores instructions executable by a processor, machine or computer. For example, the memory or computer readable medium may be any type of memory device. In several embodiments, the computer readable medium is a removable medium, such as a flash drive, floppy, hard, compact disc (CD), digital versatile disc (DVD), etc. Furthermore, the programming instructions stored on the memory 202 may be software and/or firmware.

The processor 204 can be a general purpose processor, a Field Programmable Gate Array (FPGA), an Application Specific Integrated Circuit (ASIC), a Digital Signal Processor (DSP), and/or the like. The processor 204 can run and/or execute applications, modules, processes and/or functions associated with the controller 104 and/or the control block 116. According to several embodiments, programming instructions can be provided that are stored on a memory 202 (or a computer readable medium) as a set of instructions to be executed on the processor 204 or other machine. Such instructions allow a user to program or teach an automated actuator control system a motion profile for a specific application. In several embodiments, a motion profile can be a set of register values stored in the memory 202. Once the system is taught a motion profile, the programmed instructions use the stored motion profile to operate the actuator based automated inspection process. Thus, without the motion profile, the programmed instructions are not able to execute an inspection routine of a given component.

Typically, the control system programming instructions are stored as code or a set of instructions in the memory 202. This code is executed or run by the processor 204 to implement the functionality of the code. For example, portions of the programmed instructions are retrieved from memory 202 by the processor 204 and executed using other information stored in memory 202 (e.g., as input by the user) and/or input information received from the input module 206. In use, one or more generated outputs (such a, for example. an actuator control signals, pass/fail signals, etc.) are output via the output 208 module. Referring to FIGS. 1-2, the input module 206 can receive inputs from an input device 106 (shown in FIG. 1), inputs from the master controller 108 (shown in FIG. 1) or inputs in the form of measurements (such as encoder readings) or other feedback from the actuator 102 (shown in FIG. 1). The output module 208 may send outputs to the actuator 102, to the master controller 108 and/or to the input device 106. The output of the input device 106 allows data and instructions from the input device 106 to pass to the controller 104, while the input of the input device 106 receives data and instructions from the controller 104.

In many embodiments, the programmed instructions stored in the memory of the input device (not shown in FIGS. 1-2) can allow the user to enter and store one or more motion profiles corresponding to different components to be inspected by the actuator 102 in cooperation with the programmed instructions stored in the memory 202 of the controller 104 that control the actuator 102. Such programmed instructions stored in the memory 202 of the controller 104 are based on user entered parameters at the input device 106 that are forwarded to the controller 104. In such embodiments, the memory of the input device is used to store multiple motion profiles. In other embodiments, the programmed instructions allow the stored motion profiles to be transferred from the input device 106 to additional controllers 104. Furthermore, in some embodiments, the programmed instructions stored in the memory of the input device allow for motion profiles that are generated elsewhere to be transferred into the input device 106.

In even further embodiments, the memory of the input device 106 can be used to store the "core" programming instructions that are to be used by a controller 104. Such "core" programming instructions can include instructions for the controller 104 to implement a force mode of operation and use a close loop force feedback mechanism to guide and determine soft contact of the probe 114 to the component 110 (i.e., work surface) as described in detail in relation to FIGS. 3 and 4. Additionally, such "core" programming instructions can also include instructions to implement various linear and/or non-linear least squares regression analysis based-methods for the probe 114 to reach the component 110 (i.e., the target) from either below the target level (bottom then upwards motion) or from above the target level (top then downwards motion).

One or more of these "core" programming instruction sets can then be transferred from the input device 106 to the controller 104. In one embodiment, a "core" programming instruction set (e.g., implemented as software and/or firmware) can refer to the programming instructions that would be used by a controller 104 to allow a user to program a motion profile as well as to operate the actuator 102, where the core programming instruction set is specific to the type of actuator 102 that is being controlled by the controller 104. For example, a first core programming instruction set is developed that is specific to a controller that controls an x-y actuator, a second core programming instruction set is developed that is specific to a controller that controls a linear and rotary (x and θ) actuator, and a third core programming instruction set is developed that is specific to a controller that controls an x, y, z and rotary actuator. The input device 106 can stores multiple core programming instruction sets that may be selectively transferred into a given controller 104, from, for example, a computer. Typically, the stored motion profile(s) in the memory of the input device (not shown in FIGS. 1-2) and/or the memory 202 as programmed by the user can include a set of registers in memory that each stores the commands and parameters needed for the particular inspection routine and component. Once the control system is taught a motion profile, the programmed instructions can use the stored motion profile to operate the actuator-based automated inspection process.

FIG. 3 is a functional block diagram of a system 300 including a closed loop force feedback arrangement used to guide and effect soft contact of a probe assembly to a target surface, and to then apply a desired force to the target surface, according to an embodiment. The system 300 shown in FIG. 1 can be used to achieve soft contact between the probe assembly and the target surface with tight control of the contact force on the target surface (that can be part of a delicate or fragile end product).

In one embodiment a user may set the input parameters in the input device 306. As described above, the input device 306 can be any device that can allow the user to input the desired actuator parameters such as, for example, probe movement profiles, velocities, time delays, measurements and tolerance measurements that are specific to the application. The input device 306 can be, for example, a handheld device (e.g., a handheld pendant), a personal computer, a notebook computer, and/or the like. The input device 306 can be coupled to the controller 304 via, for example, an RS-232, EIA-232, EIA-422 or EIA-485 connection. In other instances, however, the coupling of the input device 306 to the controller 304 can be done via any wired or wireless communication methods to communicate input data to the controller 304. The input parameters can be included in a set of programming instructions that are, for example, programmable by the user to operate an actuator-based component inspection system in an automated fashion. As described above, the input device 306 can include a display unit (not shown in FIGS. 1-3) that can be, for example, an LCD unit or a LED alpha-numeric display unit that displays a GUI generated by the control system that can allow a user to interact with the controller 304. The GUI may include a set of displays having message areas, interactive fields, pop-ups, pull-down lists, notification areas, and buttons operated by user. The GUI may include multiple levels of abstraction including groupings and boundaries. The programming instructions or code (implemented as software and/or firmware) installed on the input device 306 can receive a variety of user input parameters. Such input parameters are typically associated with an automated routine or motion profile for automated execution. As described above, a motion profile can be stored sequential set of probe movements and actions (e.g., to cause position measurements) and tolerance values associated with certain measurements that as a whole define the operation of the probe and measurements taken during an inspection routine.

The set of input parameters entered by the user in the input device 306 can guide the functioning of the controller 304. The controller 304 can generate control signals that control the operation of the actuator 302. As described above, the controller 304 can be a servo controller that can generate control signals that operate a moving coil actuator 302. For example, in accordance with programmed instructions, typically in the form of software, the controller 304 generates controls signals and outputs those signals to the actuator 302 to cause movement of a probe assembly (or probe) about one or more axes. In some configurations, the controller 304 can be, for example, a Galil DMC31012 controller with built-in amplifier and a 16 bit analog output. The controller 304 can send signals to operate the actuator 302 in both open loop mode (e.g., torque mode) and/or closed loop mode (e.g., force mode or park mode). Once soft contact with a target surface has been established, the closed loop mode of operation can implement a close loop force feedback mechanism to achieve a target force (e.g., 5000 grams) on the target surface.

The actuator 302 is similar to the actuator 102 shown in FIG. 1 and can be a pneumatic, hydraulic or electrical actuator. In the preferred embodiment, the actuator 302 is an electrical actuator, such as a moving coil actuator (also known as a voice coil actuator) or a moving magnet actuator that includes a linear encoder feedback mechanism. The actuator 302 can include a probe assembly (not shown) that is moveable in at least one axis. For example, depending on the specific actuator used, the probe assembly may be moved in an x, y and/or z axis relative to the body of the actuator 302. Furthermore, the probe may be rotational (θ) about one or more of the x, y and/or z axes. The actuator 302 includes one or more encoders (not shown) that are capable of taking positional measurements about one or more axes. That is, in response to control signals from the controller 304, the actuator 302 sends measurements from its encoders to the controller 304 to indicate the precise positional location of the probe about the relevant axes.

In an exemplary embodiment, the actuator 302 is operatively coupled to a load cell 312 (e.g., load cell 312 can be directly integrated on the shaft of the actuator 302). The load cell 312 is a transducer (or force sensor) that can convert a force into an electrical signal. Such load cells can be, for example, hydraulic load cells, pneumatic load cells, straingage load cells, and/or the like. The load cell 312 measures the force exerted by the probe of the actuator 302 on a contact surface (i.e., target) about a given axis. The electrical output signal of the load cell 312 is typically in the order of a few millivolts and typically necessitates amplification before it can be used. The output of the load cell 312 can be scaled to calculate the force applied to the load cell 312 as the probe approaches the target. In some configurations, the load cell 312 can be, for example, a Futek LSB200 load cell (i.e., force sensor) with a 0.01% accuracy that can operate in the 6000 g force range. The load cell amplifier 314 is an instrumentation amplifier and amplifies the electrical output signal (e.g., a voltage or a current) of the load cell 312 and interfaces with the controller 304 to send the amplified electrical signal to the controller 304. In some instances, the load cell amplifier 314 can include an analog-to-digital converter to convert the analog output of the load cell amplifier 314 to a digital signal before sending the output signal to the controller 304. In some configurations, the load cell amplifier 314 can be, for example, the Futek QIA121 analog amplifier with universal serial bus (USB) connectivity.

Figure 4:
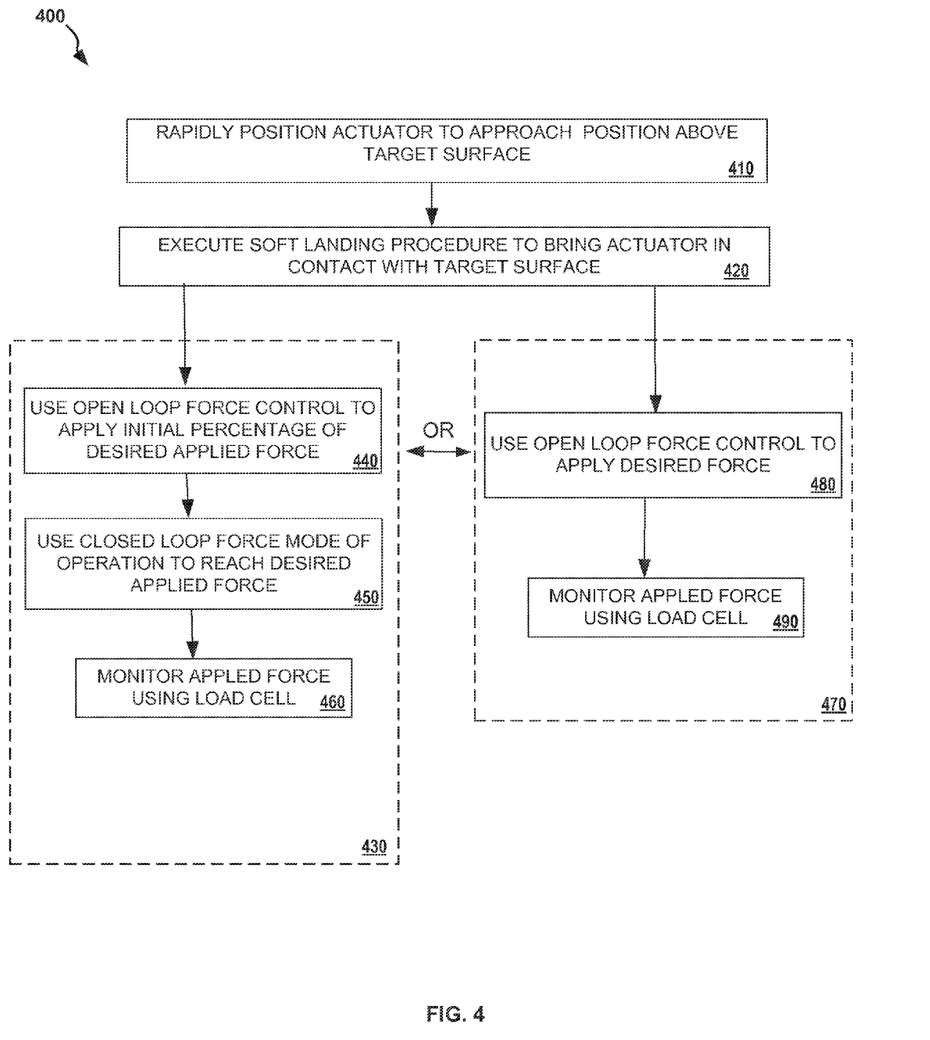
FIG. 4 is a flowchart describing exemplary operation of the actuator apparatus described with reference to FIGS. 1-3.

Attention is now directed to FIG. 4, which is a flowchart describing exemplary operation 400 of the actuator apparatus described with reference to FIGS. 1-3. The operation begins by moving the probe assembly of the actuator 302 to an approach position above or otherwise separated from the target surface (stage 410). In one embodiment the probe assembly 114 is placed at an approach position of, for example, 250 microns relative to target surfaces which are rather smooth. For target surfaces which are somewhat rougher, the approach position may be on the order of millimeters from the surface. During stage 410, the probe assembly 114 of the actuator may be brought to the approach position using the position control mode of operation referenced above. In the position control mode of operation, an optical encoder, or any type feedback device that is well known in the pertinent art, can be used to monitor the position of the probe assembly 114 relative to the approach position. Once the probe assembly 114 has been positioned at the approach position, a soft landing procedure is employed to bring the probe assembly in soft contact with the target surface (stage 420). The soft landing procedure may use any one or more of the position, velocity and torque control modes described above to achieve soft contact between the probe assembly and the target surface. For example, in the torque control mode of operation, the time rate of change of velocity of the probe (i.e., the acceleration) is monitored using the encoder and timer circuitry in the controller 104. Soft contact of the probe assembly 114 to the target surface of the component 110 results in an acceleration (deceleration or negative acceleration) of the probe assembly 114 and a determination of soft contact has occurs when the acceleration of the probe assembly 114 exceeds a predetermined threshold value. Alternatively, soft contact may be deemed to occur when the velocity of the probe assembly 114 is determined to be essentially equal to zero. In one embodiment the probe exerts an initial contact force on the target surface of the component 110 of as a result of execution of the soft landing procedure, which may be 30-40 msec. in duration.

Once such soft contact has occurred, the controller 304 may cause the desired force to be applied to the target surface of the component 110 in accordance with one of at least two different procedures. In a first force control procedure 430, open loop force control is employed such that a relatively high percentage of the desired force is initially applied to the target surface of the component 110 (stage 440). In the open loop force control mode of operation, electrical current is pumped to the actuator 302 (or probe assembly 114) to achieve a predetermined initial force on the load cell (e.g., 4950 gm in the case when the total desired force is 5000 gm). A closed loop force mode of operation may then be employed to increase the applied force to the desired level (e.g., to 5000 gm) using the current or other feedback signal produced by the load cell 312 (stage 450). During this mode of operation various linear and/or non-linear least squares regression analysis based techniques can be implemented at the controller 304 to control the movement of the probe assembly in fixed steps to very precisely achieve the desired force between the probe assembly and a target surface. The closed loop force mode of operation allows very precise control of forces in the range of 1 gram up to 10 kilogram-force (kgf) with 0.1 gm accuracy. The kilogram-force is a gravitational metric unit of force and is equal to the magnitude of the force exerted by one kilogram of mass in a 9.80665 m/s$^2$ gravitational field (standard gravity). The closed loop force mode step typically takes between 160-170 msec to complete and thus the total time taken to complete the entire operation of achieving 5000 gm force on the probe 114 (or load cell 312) and traveling 20 mm (open loop+closed loop) is approximately 200 msec. Once the applied force has reached the desired level it may be monitored based upon the current of a feedback signal produced by the load cell 312 (stage 460).

Again referring to FIG. 4, in an alternative, second force control procedure 470, an open loop force control mode operation is employed after the soft landing procedure of stage 420 has been executed in order to apply the desired force to the target surface of the component 110 (stage 480). The applied force may then be monitored based upon the current or feedback signal provided by the load cell 312 and adjusted to the extent necessary to maintain the applied force at the desired level (stage 490).

As used in this specification, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "an actuator" is intended to mean a single actuator or a combination of actuators.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described embodiments.

Some embodiments described herein, such as for example, the noise reduction methods, relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

What is claimed is:

1. A method for using a probe assembly to apply force to a target surface, the method comprising:
   moving the probe assembly into an approach position, the approach position being a predetermined distance from the target surface;
   moving the probe assembly from the approach position to the target surface pursuant to a soft landing procedure, the soft landing procedure including determining that the probe assembly has moved into soft contact with the target surface wherein the probe assembly exerts an initial contact force on the target surface as a result of execution of the soft landing procedure;
   applying, subsequent to establishment of the soft contact between the probe assembly and the target surface, force to the probe assembly until an applied force on the target surface reaches a desired force different from the initial contact force wherein the applying includes applying an initial portion of the desired force to the target surface by operating the probe assembly in an open loop force control mode and incrementally applying a remaining portion of the desired force to the target surface by operating the probe assembly in a closed loop force mode of operation; and
   monitoring the applied force based upon an output of a load cell responsive to a force exerted by the probe assembly wherein the closed loop force mode of operation utilizes the output of the load cell.

2. The method of claim 1 wherein the initial portion of the desired force is at least 99% of the desired force.

3. The method of claim 2 wherein the probe assembly is moved in fixed steps during the closed loop force mode of operation.

4. The method of claim 1 wherein a least squares regression analysis is used in controlling movement of the probe assembly in fixed steps during the closed loop force mode of operation.

5. The method of claim 4 wherein the closed loop force mode of operation utilizes the output of the load cell.

6. An apparatus, comprising:
   an actuator including a probe moveable in at least one dimension;
   a load cell operative to measure a force exerted by the probe on a contact surface and to provide an output signal based upon the force; and
   a controller configured to provide control signals to the actuator based upon a set of input parameters and the output signal wherein:
      pursuant to a soft landing procedure, first ones of the control signals cause the probe to move from an approach position to the contact surface, the soft landing procedure including determining that the probe has moved into soft contact with the contact surface wherein the probe exerts an initial contact force on the contact surface as a result of execution of the soft landing procedure, and
      during operation in an open loop force control mode subsequent to establishment of the soft contact between the probe assembly and the target surface, second ones of the control signals cause the probe to apply an initial portion of a desired force different from the initial contact force to the contact surface, and during operation in a closed loop force mode of operation, third ones of the control signals cause the probe to incrementally apply a remaining portion of the desired force to the target surface wherein the closed loop force mode of operation utilizes the output of the load cell.

7. The apparatus of claim 6 wherein the load cell is integrated with the probe.

8. The apparatus of claim 6 wherein the controller includes a memory for storing a probe movement profile corresponding to an application.

9. The apparatus of claim 6 wherein the initial portion of the desired force is at least 99% of the desired force.

10. The apparatus of claim 9 wherein a least squares regression analysis is used in controlling movement of the probe in fixed steps during operation in the closed loop force mode of operation.

11. The apparatus of claim 6 further including a load cell amplifier for amplifying the output signal.

\* \* \* \* \*